United States Patent
Oh et al.

(10) Patent No.: US 7,991,848 B2
(45) Date of Patent: Aug. 2, 2011

(54) METHOD AND APPARATUS FOR SENDING INSTANT MESSAGE DISPOSITION NOTIFICATION REQUEST AND RESPONSE IN A CONVERGED-IP MESSAGING SERVICE AND SYSTEM THEREOF

(75) Inventors: Gyu-Bong Oh, Suwon-si (KR); Seung-Yong Lee, Seoul (KR); Kyung-Tak Lee, Yongin-si (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 49 days.

(21) Appl. No.: 12/635,164

(22) Filed: Dec. 10, 2009

(65) Prior Publication Data

US 2010/0153505 A1 Jun. 17, 2010

(30) Foreign Application Priority Data

Dec. 11, 2008 (KR) .................. 10-2008-0125913

(51) Int. Cl.
*G06F 13/00* (2006.01)

(52) U.S. Cl. .............. 709/206; 709/219; 709/207
(58) Field of Classification Search .............. 709/204, 709/206, 207, 217, 219
See application file for complete search history.

(56) References Cited

U.S. PATENT DOCUMENTS

| 2007/0226309 A1* | 9/2007 | Bell et al. ............ 709/206 |
| 2007/0239830 A1* | 10/2007 | Barnes et al. ............ 709/206 |
| 2009/0106365 A1* | 4/2009 | Drory et al. ............ 709/206 |
| 2009/0204681 A1* | 8/2009 | Sun ............ 709/206 |
| 2010/0087215 A1* | 4/2010 | Gu et al. ............ 455/466 |

* cited by examiner

*Primary Examiner* — Viet Vu
(74) *Attorney, Agent, or Firm* — The Farrell Law Firm, P.C.

(57) ABSTRACT

A method is provided for sending an Instant Message Disposition Notification (IMDN) request to a receiving terminal by a sending terminal in a Converged-IP Messaging (CPM) service. The sending terminal generates an instant message to be sent to the receiving terminal, inserts an IMDN request message into the generated instant message, the IMDN request message including a predetermined response limit time, and sends the instant message with the IMDN request message to the receiving terminal through a CPM server.

24 Claims, 12 Drawing Sheets

METHOD AND APPARATUS FOR SENDING INSTANT MESSAGE DISPOSITION NOTIFICATION REQUEST AND RESPONSE IN A CONVERGED-IP MESSAGING SERVICE AND SYSTEM THEREOF

PRIORITY

This application claims priority under 35 U.S.C. §119(a) to a Korean Patent Application filed in the Korean Intellectual Property Office on Dec. 11, 2008 and assigned Serial No. 10-2008-0125913, the entire disclosure of which is hereby incorporated by reference.

BACKGROUND OF THE INVENTION

1. Field of the Invention

The present invention relates generally to Instant Message Disposition Notification (IMDN) request and response in a Converged-IP Messaging (CPM) service, more particularly, to a method and apparatus for sending an IMDN request and response with a response limit time being set therein in a CPM service, and a system thereof.

2. Description of the Related Art

In existing systems, mobile terminals can send single-shot messages such as Short Message Service (SMS) messages and Multimedia Message Service (MMS) messages. Users have increasingly expected a new message service that makes it easy to exchange conversations, like Instant Messenger used in the wired environment. To meet the expectations, an Instant Message (IM) service has been introduced to terminals and a network on the basis of a Session Initiation Protocol/Internet Protocol (SIP/IP) Core network. Also, a Push to talk over Cellular (PoC) service and a system based on the SIP/IP Core network have been developed to meet the demands of users and companies for Push To Talk (e.g., walkie-talkie). In addition, with the rapid change in enterprise and market of communication industry, users have increasing demands for disposing or handling various types of received messages in a converged manner.

Considering these facts, Open Mobile Alliance (OMA), a standard group enacting international private standards for mobile solutions and services, has recently developed a standard technology for a Converged IP Message (CPM) service that is realized over the SIP/IP Core network.

The CPM service, a message service based on IP Multimedia Subsystem (IMS), provides the existing SMS, MMS and the like, based on Internet Protocol (IP) in a converged way. While the current message service enables message delivery and reception only within the limited network and terminals, CPM provides IP-based unified message services regardless of terminal, media, network and service types.

Figure 1:
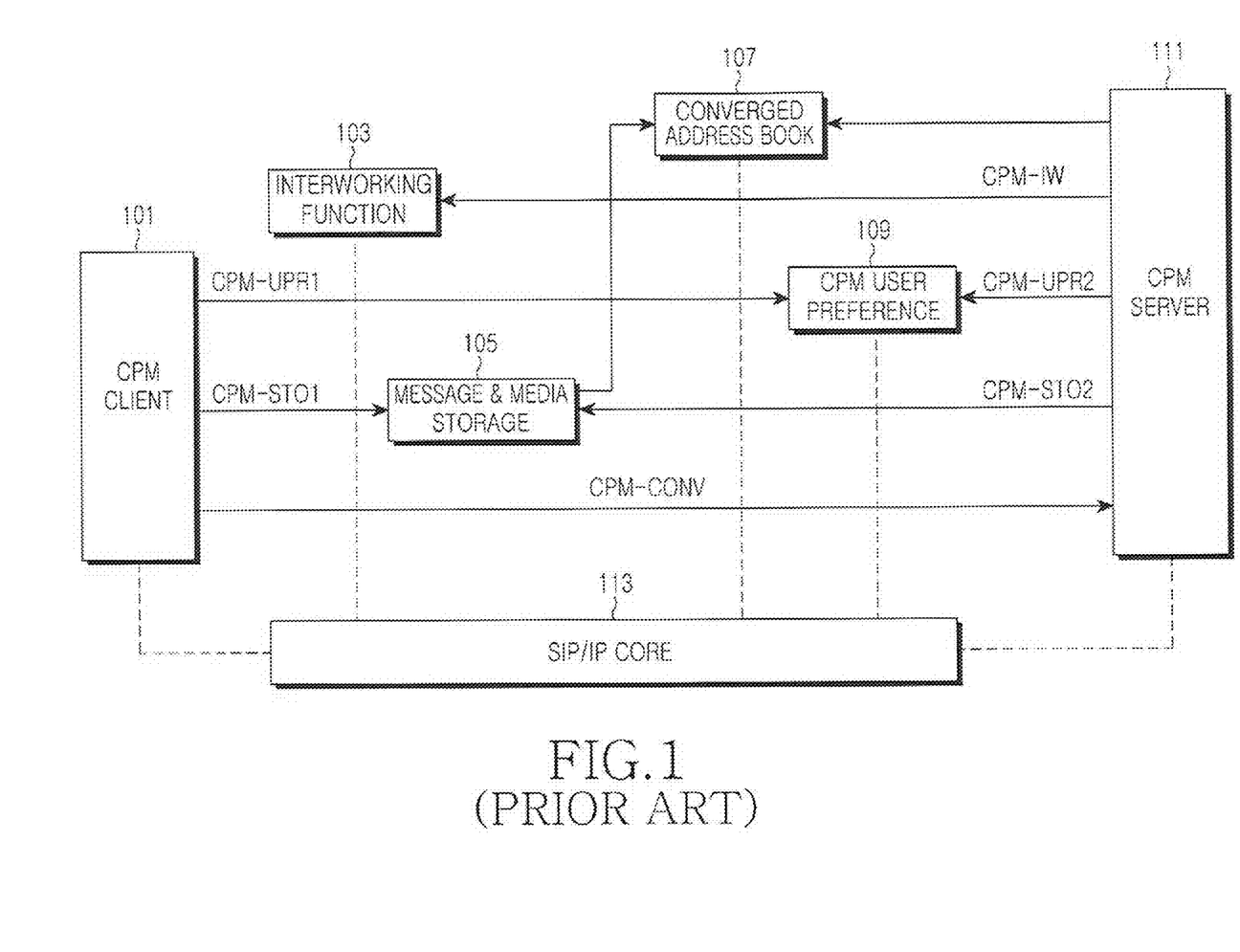
FIG. 1 is a block diagram illustrating a configuration of a general CPM system.

FIG. 1 is a block diagram illustrating a configuration of a general CPM system.

A CPM client 101 sends a message of a CPM user or receives a message for the CPM user. A CPM user preference 109 stores a particular preference of the CPM user and notifies a CPM server (or a call server) 111 of the particular preference. The CPM user should previously set the user preference. The CPM server 111 applies a service policy to messages originating from the CPM client 101, and delivers the messages to entities on a proper route inside or outside the CPM system. For example, if a message that has arrived at the CPM server 111 does not agree with the particular preference of the user, the CPM server 111 may reject the message, or when a message from a particular user has been received, the CPM server 111 may send the message according to a user policy. An Interworking Function (IWF) 103 converts a non-CPM message format into a CPM message format so as to enable communication between the CPM client 101 and a non-CPM service. A message & media storage 105 stores messages being delivered to the user, in the absence of the CPM user or according to a condition set by the user. A Converged Address Book (CAB) 107, a sort of telephone directory, includes contact lists and also includes presence information for each contact list. The 'presence' as used herein refers to information about a type or the like of the service to which a client corresponding to each contact list has subscribed. An SIP/IP core 113 routes messages among the above-stated entities.

In a CPM service, when sending a message, a sending client may send a request for information about disposition results on the sent message, to a receiving client or a call server. The information related to the disposition results is referred to as the IMDN.

Figure 2:
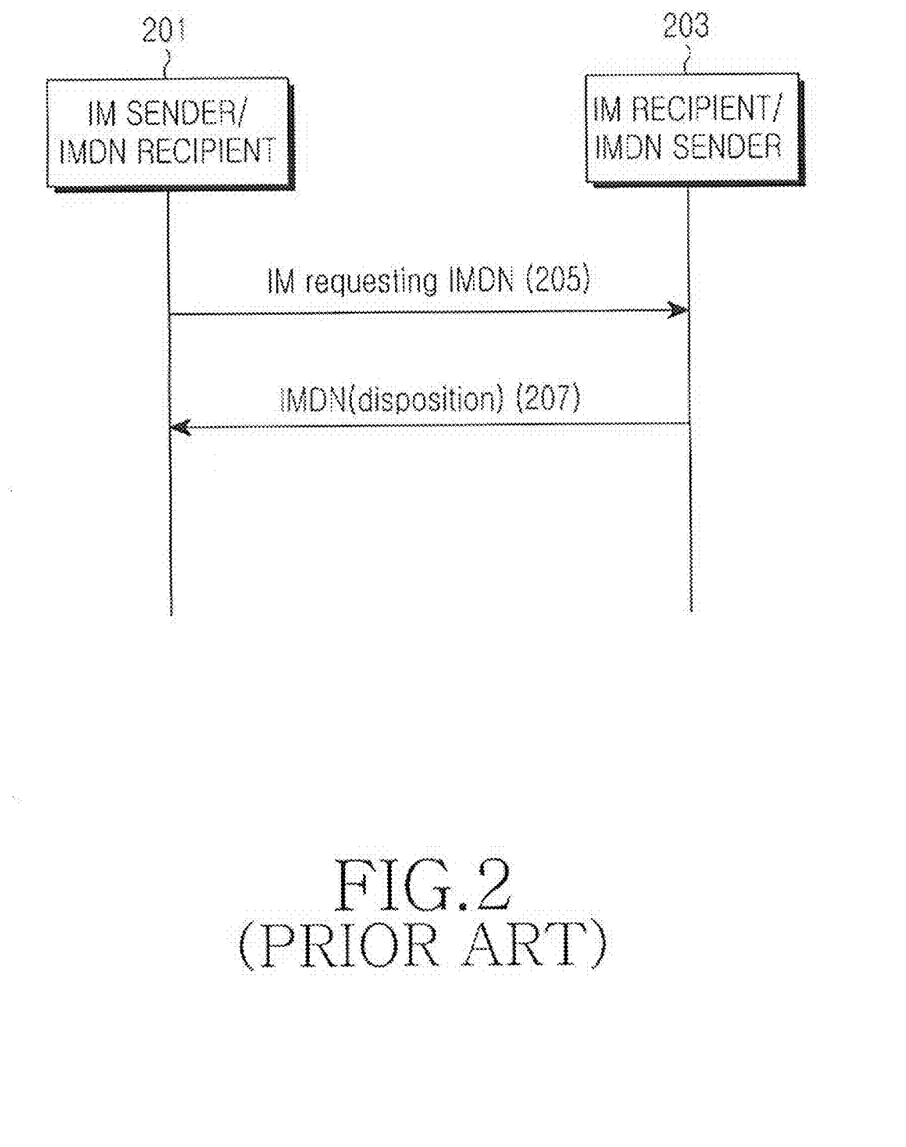
FIG. 2 is a flow diagram illustrating an exchange of an IMDN request and a response thereto in a CPM system.

FIG. 2 is a flow diagram illustrating an exchange of an IMDN request and a response thereto in a CPM system.

If an Instant Message (IM) sender 201 sends an IM message requesting an IMDN in step 205, an IM recipient 203 responds with the IMDN in response thereto in step 207.

Table 1 below sets forth a definition of different types of IMDN requests that can be used in the process of FIG. 2. The IMDN request that the IM sender 201 can send to the IM recipient 203 can be broadly categorized into three types. In response thereto, the IM recipient 203 informs the IM sender 201 of message disposition results using a few types of Notification messages.

Referring to Table 1, Delivery type indicates whether an IM message has been delivered to the IM recipient 203, Processing type indicates whether the IM message has been processed in a call server, and Read type indicates whether the IM recipient 203 has read or played the CPM message (or IM message).

TABLE 1

| Type | Delivery | Processing | Read |
|---|---|---|---|
| Function | Indicate whether the message has been delivered to a receiving client. | Indicate whether the message has been processed in a call server. | Indicate whether a receiving client has read or played the message. |
| Type of response | "delivered": indicates that the message has been delivered to the receiving client. "failed": indicates that the message cannot be delivered | "processed": indicates that the message has been normally processed in the call server. "stored": indicates that the message was stored in the network | "read": indicates that the receiving client has read or played the message. "error": indicates impossibility of determining whether the receiving client |

TABLE 1-continued

| Type | Delivery | Processing | Read |
| --- | --- | --- | --- |
| | to the receiving client: "error": indicates impossibility of determining whether the message has been delivered to the receiving client. "forbidden": indicates that Delivery Report is forbidden. | for later delivery. "error": indicates impossibility of checking the processing results on the message. "forbidden": indicates that Processing Report is forbidden. | has read the message. "forbidden": indicates that Read Report is forbidden. |

Figure 3:
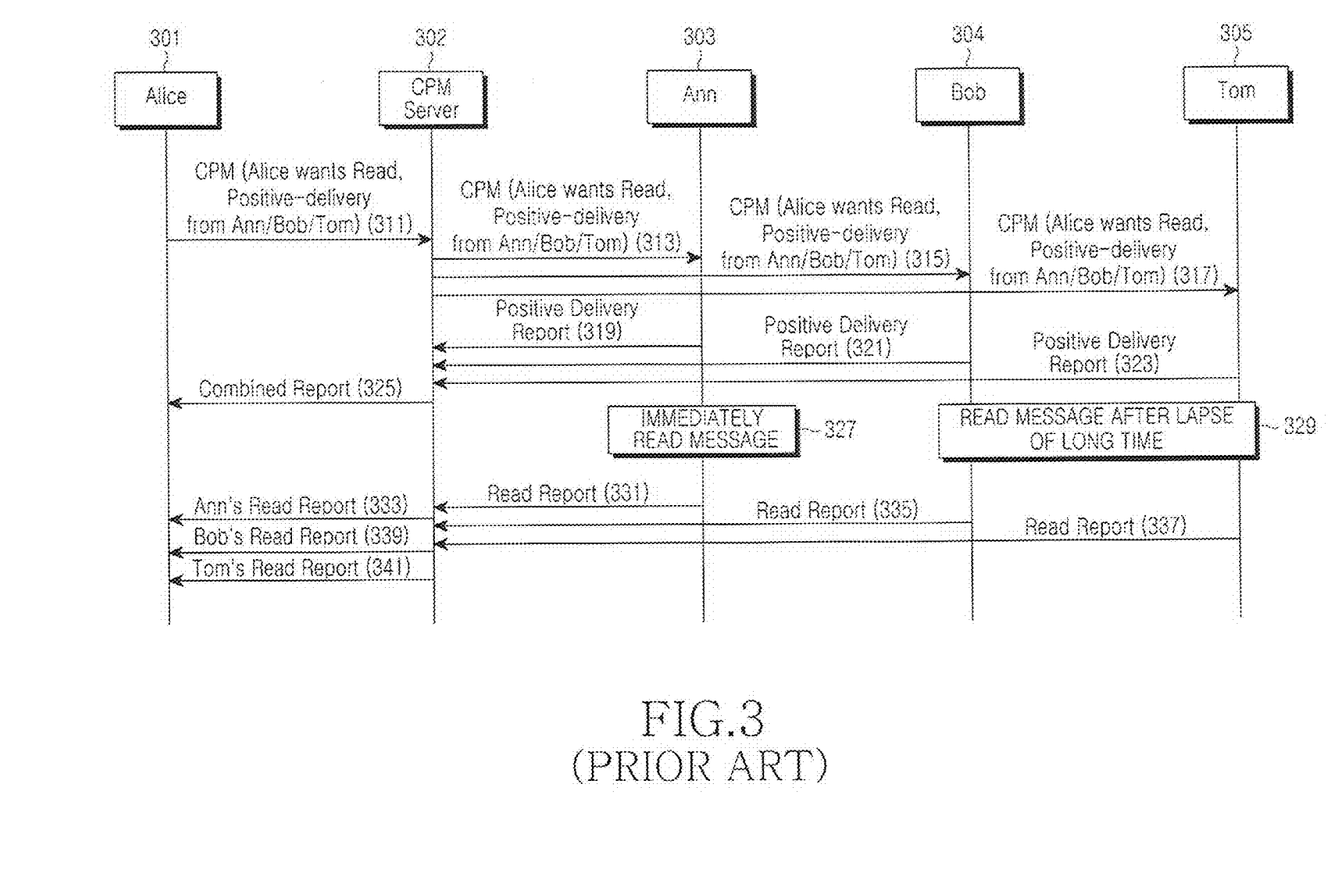
FIG. 3 is a flow diagram illustrating a process of sending an IMDN request and receiving a response thereto from a receiving client by a sending client in a CPM service.

FIG. 3 is a flow diagram illustrating a process of sending an IMDN request and receiving a response thereto from a receiving client by a sending client in a CPM service.

In FIG. 3, it is assumed that a sending client sends an IMDN request, including messages in the delivery type and the read type among the message types, to receiving clients. It is also assumed that the sending client is Alice 301, and the receiving clients are Ann 303, Bob 304 and Tom 305.

In step 311, Alice 301 sends an IMDN request for requesting notification in the read type and the delivery type from Ann 303, Bob 304 and Tom 305, to a CPM server 302 using a CPM message. In steps 313 to 317, the CPM server 302 delivers the CPM message to each of Ann 303, Bob 304 and Tom 305. In this drawing, the message delivery in steps 313 to 317 is performed in sequence, but the messages may be delivered at the same time. In steps 319 to 323, each of Ann 303, Bob 304 and Tom 305, receiving the CPM message, sends a positive delivery report acknowledging the CPM message to the CPM server 302. In step 325, the CPM server 302 sends to Alice 301 a combined report indicating that the CPM message has been delivered to all of the receiving clients.

Meanwhile, assume that Ann 303 has immediately read the received CPM message in step 327, while Bob 304 and Tom 305 have read the received CPM message after a lapse of a considerable time in step 329. Therefore, Ann 303 immediately sends a read report to the CPM server 302 in step 331, and the CPM server 302 delivers the read report of Ann 303 to Alice 301 in step 333. Similarly, if each of Bob 304 and Tom 305 sends a read report to the CPM server 302 in steps 335 and 337, the CPM server 302 delivers the read reports from Bob 304 and Tom 305 to Alice 301 in step 339 and 341.

As described above, user Bob 304 and user Tom 305 have read the received CPM message after a lapse of a long time in step 329. Meanwhile, since Alice 301 sent the request for a read report to all of the receiving clients in step 311, Alice 301 is continuously waiting for the read reports from Bob 304 and Tom 305. However, like the read reports from Bob 304 and Tom 305, when read reports have arrived at Alice 301 after a lapse of a long time since the sending of the IMDN request by Alice 301, the sending client of Alice 301 may sometimes no longer need the read reports that arrived late. For example, if the sending client's intention to request the read reports was to expect fast responses to an urgent message, the late-arriving read reports may serve as spam messages, which are no longer needed by the sending client, i.e., Alice 301.

If a receiving client sends a read report even in this case, the receiving client sends an unnecessary message, wasting resources such as power. Thus, the CPM server hears an unnecessary load and the sending client should also wait for and receive the unnecessary message.

SUMMARY OF THE INVENTION

An aspect of the present invention is to address at least the above-mentioned problems and/or disadvantages and to provide at least the advantages described below. Accordingly, an aspect of the present invention provides a method and apparatus for preventing a client from receiving an unnecessary message in a CPM service, and a system thereof.

Another aspect of the present invention provides a method and apparatus for preventing a client from sending an unnecessary message in a CPM service, and a system thereof.

Another aspect of the present invention provides a method and apparatus for preventing a CPM server from sending an unnecessary message to clients in a CPM service, and a system thereof.

In accordance with one aspect of the present invention, there is provided a method for sending an Instant Message Disposition Notification (IMDN) request to a receiving terminal by a sending terminal in a Converged-IP Messaging (CPM) service. The method includes generating an instant message to be sent to the receiving terminal; inserting an IMDN request message into the generated instant message, the IMDN request message including a predetermined response limit time; and sending the instant message with the IMDN request message to the receiving terminal through a CPM server. The method further includes resetting the response limit time to 0, if the sending terminal desires to receive no IMDN response before a lapse of the response limit time; and including an IMDN request message with the response limit time being reset to 0 in an instant message, and sending the instant message to the receiving terminal.

In accordance with another aspect of the present invention, there is provided a method for sending an IMDN response by a receiving terminal in a CPM service. The method includes receiving an IMDN request message with a predetermined response limit time being set therein, which was sent by a sending terminal, through a CPM server; determining whether the response limit time has elapsed; and sending no IMDN response if the response limit time has elapsed. The method further includes sending no IMDN response, if an instant message including an IMDN request message with a response limit time being set to 0 is received before a lapse of the set response limit time.

In accordance with another aspect of the present invention, there is provided a terminal apparatus for sending Instant Message Disposition Notification (IMDN) request and response in a Converged-IP Messaging (CPM) service. The terminal apparatus includes an instant message generator for generating an instant message including an IMDN request message; a response limit time setter for setting a response limit time for the response message; a controller for including the set response limit time and the IMDN request message in the instant message, and sending the instant message through a transceiver; and the transceiver for sending the instant message through a CPM server.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Reference will now be made in detail to certain embodiments of the present invention, examples of which are illustrated in the accompanying drawings. Wherever possible, the same reference symbols will be used throughout the drawings to refer to the same or like parts. In addition, descriptions of well-known functions and constructions are omitted for clarity and conciseness.

In the present invention, a sending client sends an IMDN request with information about a response limit time for the IMDN request, and a receiving client does not send a read report after a lapse of the response limit time. For this purpose, a definition is given of a message format containing a new parameter (i.e. "imdn-expires") used to include the response limit time information in an IMDN request message.

Two different schemes for sending an IMDN request message containing the response limit time to multiple receiving clients will be described. One is to directly indicate all Uniform Resource identifiers (URIs) of receiving clients in a "To" header in a header part of the IMDN request, and another is to write a reference value indicating a URI list group consisting of URN of multiple receiving clients in a "To" header in a header part of the IMDN request and separately indicate the URI lists in a body of the IMDN request.

More specifically, in accordance with a first embodiment of the present invention, a sending client sends an IMDN message with response limit time information to a plurality of receiving clients and receives responses thereto, which will be described in FIGS. 4 and 5.

In accordance with a second embodiment of the present invention, a sending client sends an IMDN request with response limit time information and then cancels the IMDN request before a lapse of the response limit time, which will be described in FIG. 6.

In accordance with a third embodiment of the present invention, when one receiving client uses a plurality of devices, a sending client sends an IMDN request with response limit time information to all of the multiple devices and then receives responses thereto, which will be described in FIGS. 7 and 8.

An "imdn-expires" parameter newly defined in the present invention will be described first.

RFC 3261, a standard for SIP, defines SIP header fields that are indispensable for the generation of SIP messages. A "To" header field, one of the SIP header fields, indicates a recipient of an SIP request. A format of the "To" header field will be described with reference to Table 2 below.

TABLE 2

To = ( "To" "t" ) HCOLON ( name-addr
addr-spec ) *( SEMI to-param )
name-addr = [ display-name ] LAQUOT addr-spec RAQUOT
addr-spec = SIP-URI SIPS-URI absoluteURI
display-name = *(token LWS) quoted-string
to-param = tag-param generic-param
tag-param = "tag" EQUAL token Referring to Table 2, the "To" header field includes a "name-addr" or "addr-spec" parameter and a "to-param" parameter.

The "name-addr" parameter is expressed as "display-name" and "addr-spec", and the "display-name" can be omitted and expressed in a character string. The "addr-spec" may be represented as one of "SIP-URI", "SIPS-URI", "absoluteURI".

The "to-param" parameter can be separated into several sub-parameters by semicolons, and may be expressed as "Tag-param" or "generic-param". The "generic-param", a detailed definition of which is not given, can be separately defined by an individual service provider and/or user. The present invention defines the new parameter "generic-param" as "imdn-expires" in order to set a response limit time for an IMDN request.

Table 3 below shows a format of "imdn-expires" defined by the present invention.

TABLE 3 imdn-expires = "imdn-expires" EQUAL delta-seconds

Referring to Table 3, the imdn-expires parameter indicates a response limit time desired by a sending client, i.e., a valid period of an IMDN request, when the sending client sends the IMDN request.

In a common CPM service, a value of the imdn-expires parameter should be set to at least 90 seconds, because the minimum session expiration period set in the CPM service is 90 seconds. However, since it is recommended in the CPM service that the session expiration period be set to 30 minutes, a value of the imdn-expires parameter is also preferably set to 30 minutes or more. A maximum value of the imdn-expires parameter is set to 2^32−1=4294967295 seconds, which is the maximum settable value of an "expires" header defined in an SIP message. The "expires" header may serve to indicate a valid period of a certain message.

A sending client may set an IMDN response limit time by including the "imdn-expires" in an IMDN request and sending the IMDN request to receiving clients. As described above, the present invention provides two different schemes for sending an IMDN request with a response limit time being set therein to a plurality of receiving clients by a sending client. One of the schemes indicates each of the receiving clients in a "To" header, while another scheme indicates the plurality of receiving clients in the "To" header as one group. Table 4 below shows an example of a message format for the former case, and Table 5 below shows an example of a message format for the latter case.

TABLE 4

From: Alice <im:alice@example.com>
To: Ann <im:Ann@example.com>;imdn-expires=1800
To: Bob <im:bob@example.com>;imdn-expires=1800
To: Tom <im:Tom@example.com>;imdn-expires=1800
NS. imdn <urn:ietf:params:imdn>
Imdn:Message-ID. 34jk324j
DateTime: 2006-04-04T12:16:49-05:00
imdn.Disposition-Notification: read. positive-delivery
Content-type: text plain
Content-length: 12
Hello World It can be noted in Table 4 that while sending a message "Hello World" to receiving clients of Ann, Bob and Torn, a sending client of Alice sets a response limit time for Ann, Bob and Tom to 1800 seconds by setting each of values of "imdn-expires" parameters in the "To" header to "1800".

TABLE 5

From: Alice <im:alice@example.com>
To: <fool@example.com>;imdn-expires=1800
NS: imdn <urn:ietf:params:imdn>
Imdn.Message-ID: 34jk324j
DateTime: 2006-04-04T12:16:49-05:00
imdn.Disposition-Notification: read. positive-delivery
Content-type: multipart mixed: boundary="content-boundary"
Content-length: 412
--content-boundary
Content-type: text-plain
Content-length: 12
Hello World
--content-boundary
Content-type: application resource-lists-xml
Content-Length: 400
Content-ID: <fool@example.com>
<?xml version= '1.0' encoding='UTF-8'?>
<resource-lists xmlns="urn:ietf:params:xml:ns:resource-lists'
          xmlns:xsi='http: www.w3.org XML Schema-instance '>
    <list>
        <entry uri="im:ann@example.com">
            <display-name>Ann</display-name>
        </entry>
        <entry uri="im:bob@example.com">
            <display-name>Bob</display-name>
        </entry>
        <entry uri="im:tom@example.com">
            <display-name>Tom</display-name>
        </entry>
    < list>
< resource-lists>
--content-boundary--

It can be noted in Table 5 that an IMDN response limit time is set for a plurality of receiving clients by grouping the plural receiving clients into one group, designating a URI list having URIs of the receiving clients in the group, and representing an "id" indicating the designated URI list in the "To" header.

That is, unlike in Table 4, content-id indicating a URI list is set as "fool@example.com" in Table 5. For reference, "fool" is a name of the group to which the multiple receiving clients belong. Since the scheme of Table 5 can indicate multiple receiving clients by designating a URI list with the content-id, even though there are multiple receiving clients, a sending client has no need to annoyingly designate the receiving clients one by one unlike in the scheme of Table 4. Disadvantageously, however, the scheme of Table 5 is greater than the scheme of Table 4 in terms of Content-Length. That is, it is noted that Content-Length in Table 4 is 12, but Content-Length in Table 5 is 412.

Figure 4:
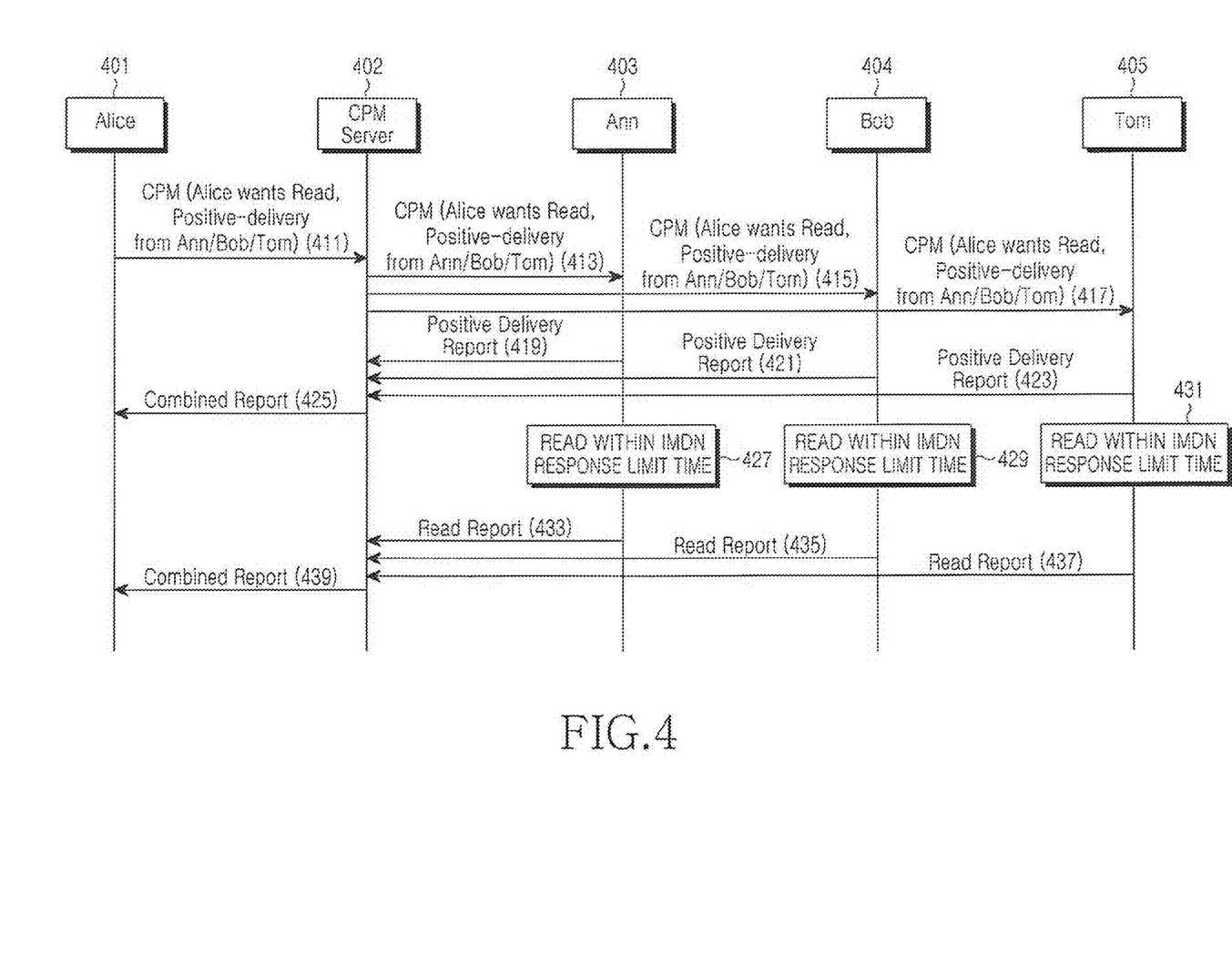
FIGS. 4 and 5 are flow diagrams illustrating an exchange of an IMDN request and a response thereto according to a first embodiment of the present invention.
Figure 5:
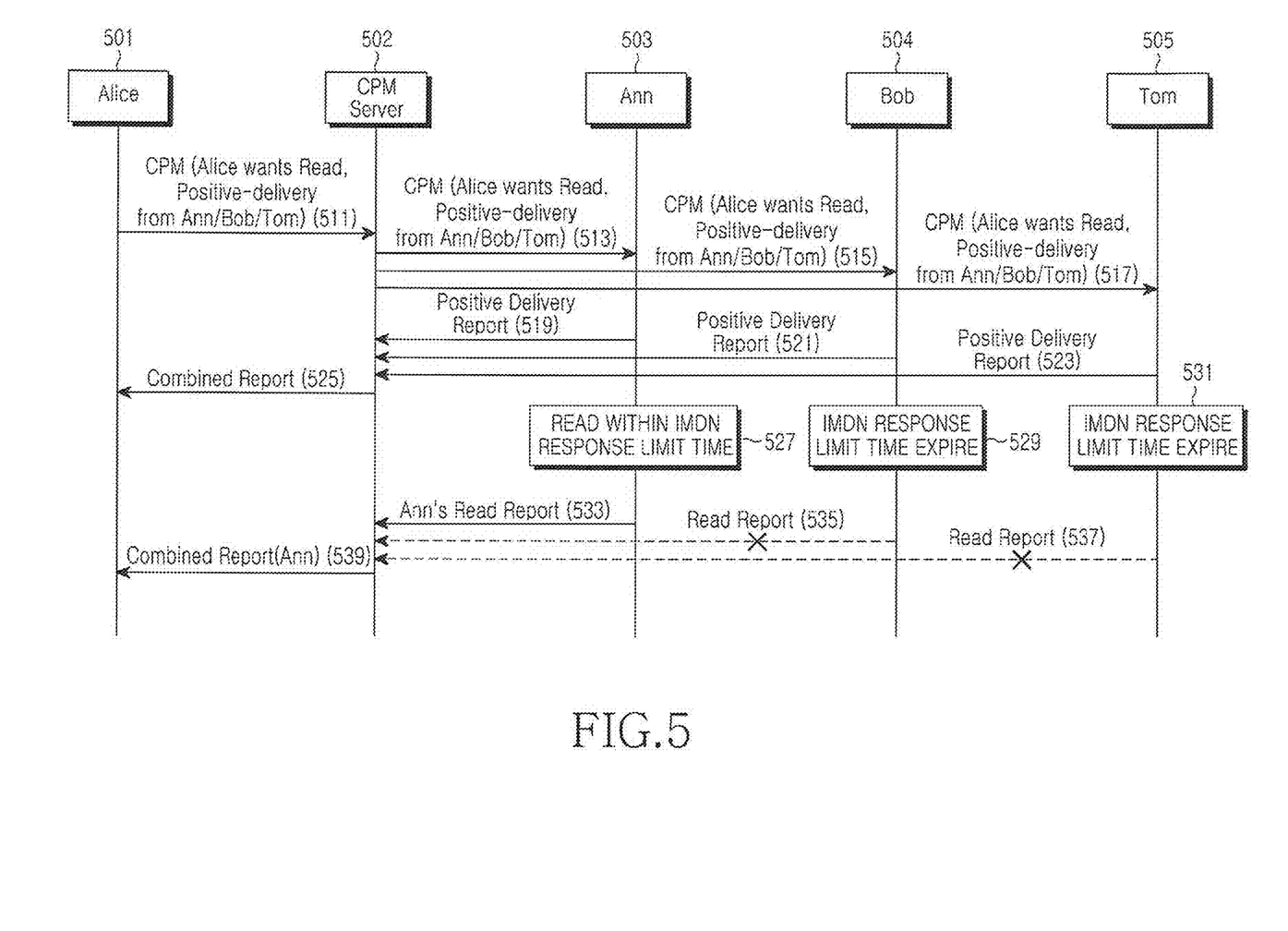

FIGS. 4 and 5 are flow diagrams illustrating an exchange of an IMDN request and a response thereto according to a first embodiment of the present invention. It is assumed in FIG. 4 that all of receiving clients have read a received message within a response limit time.

Steps 411 to 425 are the same as steps 311 to 325 in FIG. 3 except that in FIG. 4, a CPM message includes response limit time information as described in Table 4 and Table 5. As stated above, it is assumed in FIG. 4 that all of the receiving clients, Ann 403, Bob 404 and Tom 405, have read a received message within the response limit time in steps 427, 429 and 431, respectively. Since all the receiving clients 403, 404 and 405 have read a received message within the response limit time, if each of the receiving clients 403, 404 and 405 sends a read report to a CPM server 402 in steps 433 to 437, the CPM server 402 generates a combined message by combining all of the read report messages and sends the combined message to Alice 401. Instead of the combined message based on read reports, individual report messages may be sent according to the service policy.

It is assumed in FIG. 5 that some of the receiving clients have failed to read the received message within the response limit time. Steps 511 to 525 in FIG. 5 are the same as steps 411 to 425 in FIG. 4. Ann 503 has read the received message within the response limit time in step 527, while Bob 504 and Tom 505 have failed to read the received message within the response limit time in steps 529 and 531, respectively. Therefore, Ann 503 sends a read report to a CPM server 502 in step 533, but Bob 504 and Torn 505 do not send their read reports in steps 535 and 537, because of a lapse of the response limit time. In step 539, the CPM server 502 sends the read report received from Ann 503 to Alice 501 in the form of a combined message.

Figure 6:
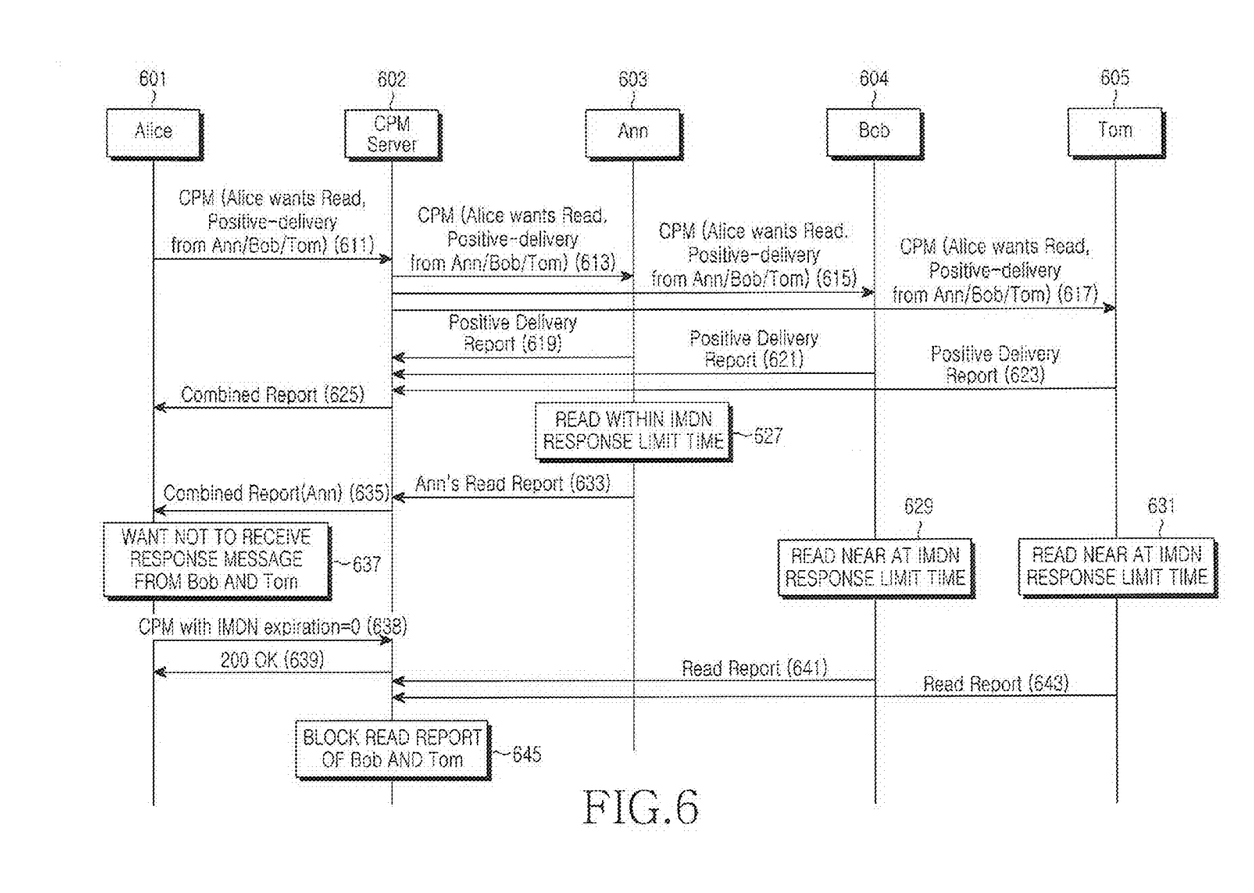
FIG. 6 is a flow diagram illustrating an exchange of an IMDN request and a response thereto according to a second embodiment of the present invention.

FIG. 6 is a flow diagram showing an exchange of an IMDN request and a response thereto according to a second embodiment of the present invention. In accordance with the second embodiment, a sending client sends an IMDN request containing response limit time information and then cancels the IMDN request before a lapse of the response limit time.

Steps 611 to 625 are the same as steps 411 to 425 in FIG. 4. It is assumed that Ann 603 has read a received message within the response limit time in step 627, and Bob 604 and Tom 605 have read the received message at the response limit time in steps 629 and 631.

Since Ann 603 has read the received message in step 627, Ann 603 sends a read report to a CPM server 602 in step 633, and the CPM server 602 receiving the read report sends the read report from Ann 603 to Alice 601 using a combined message in step 635. However, even though the response limit time has not elapsed, Alice 601 may no longer need to receive IMDN responses from Bob 604 and Tom 605 in step 637. In order to receive no more IMDN responses from Bob 604 and Tom 605, Alice 601 sends a CPM message with "imdn expiration=0" (i.e., with the response limit time being set to "0") to the CPM server 602 in step 638. In response, the CPM server 602 sends a response (200 OK) to Alice 601 in step 639. Meanwhile, Bob 604 and Tom 605 each send a read report to the CPM server 602 in steps 641 and 643. Upon receiving the read reports from Bob 604 and Tom 605, the CPM server 602 would normally send the react reports to Alice 601. However, since the CPM server 602 received an IMDN cancel request with the response limit time being set to "0" from Alice 601 in step 638, the CPM server 602 does not send, or blocks the read reports of Bob 604 and Tom 605 to Alice 601 in step 645.

In the second embodiment, if a sending client cancels the read report request before a lapse of the response limit time, the CPM server 602, after receiving the read report cancel request, consumes react reports received from the receiving clients by itself, and no longer sends the received read reports to the sending client. Therefore, the sending client may not receive unwanted IMDN responses, and the CPM server 602 may also reduce a load of sending unnecessary IMDN response messages to the sending client.

Figure 7:
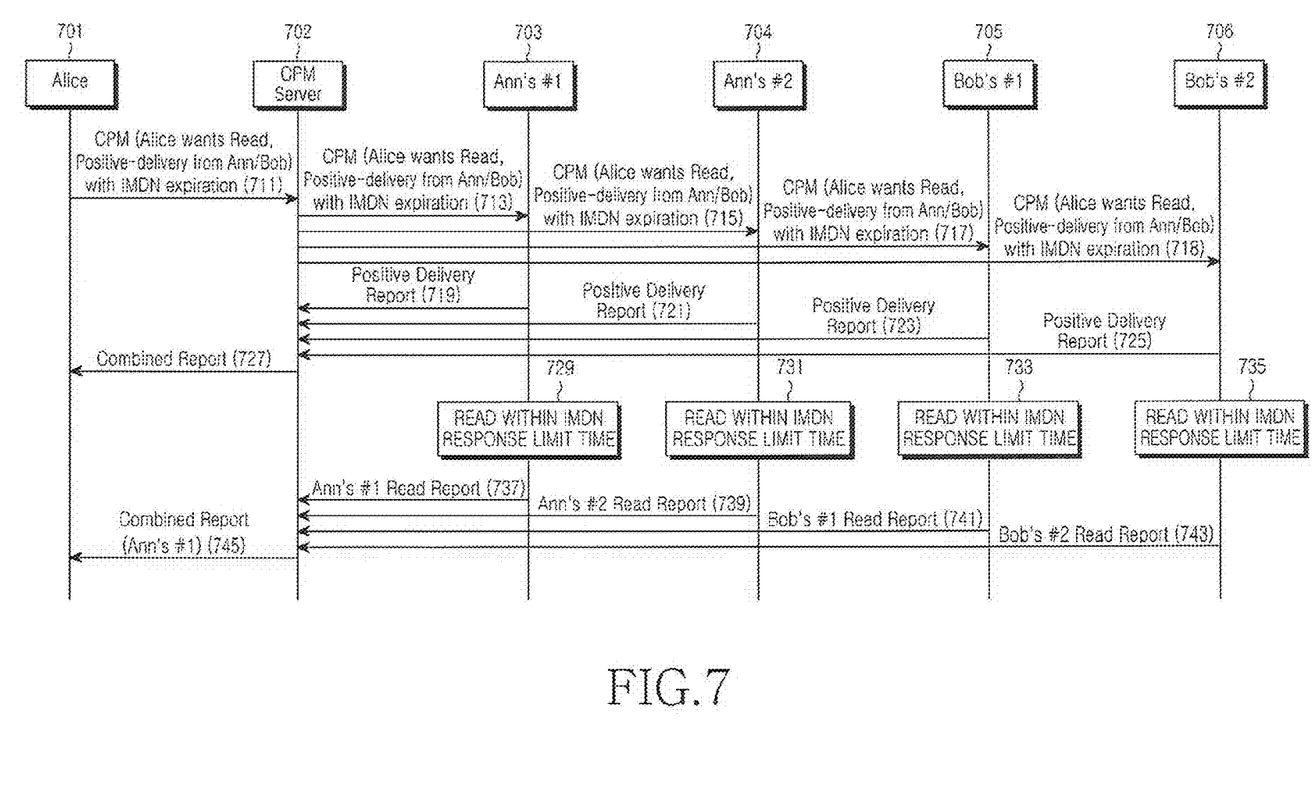
FIGS. 7 and 8 are flow diagrams illustrating an exchange of an IMDN request and a response thereto according to a third embodiment of the present invention.
Figure 8:
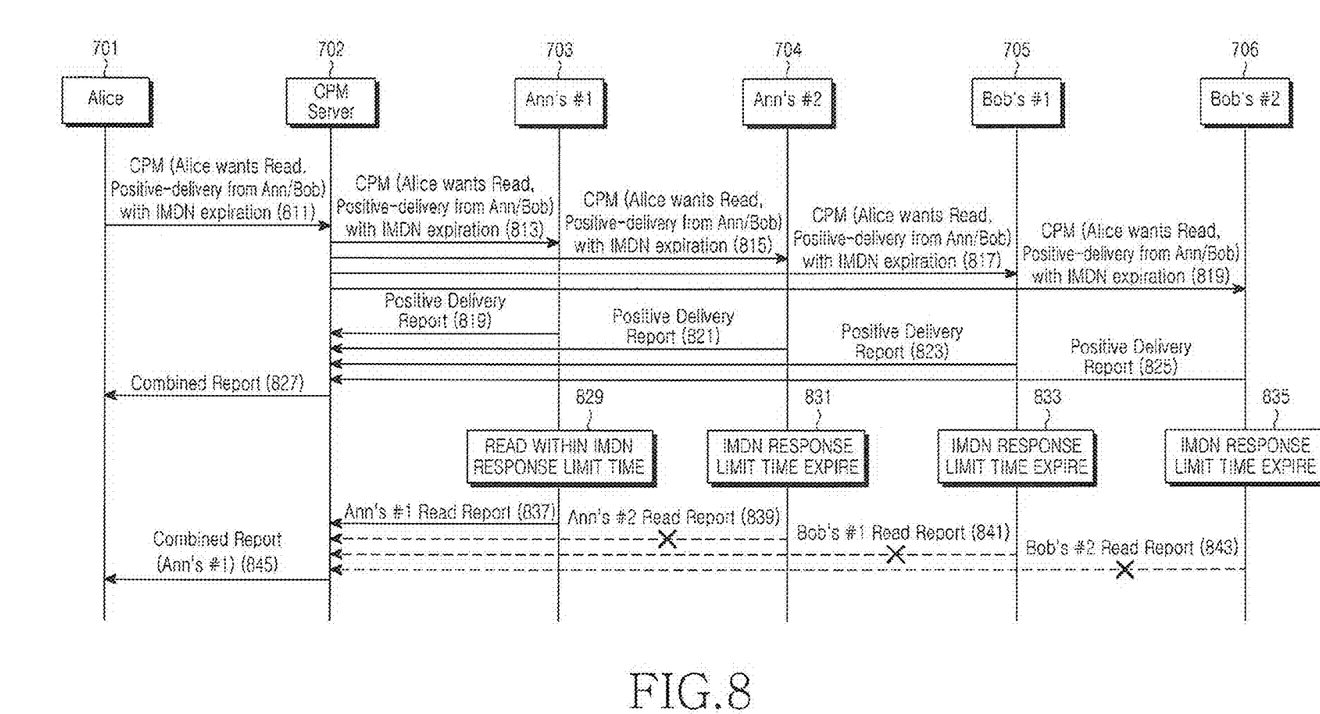

FIGS. 7 and 8 are flow diagrams illustrating an exchange of an IMDN request and a response thereto according to a third embodiment of the present invention. The third embodiment takes into consideration that one receiving client uses a plurality of devices. It is assumed in FIG. 7 that all of the devices used by one receiving client have read a received message within a response limit time.

In step 711, Alice 701 sets a response limit time in accordance with the scheme of Table 4 or Table 5, and sends a CPM message requesting delivery report and react report from receiving clients Ann and Bob, to a CPM server 702. In steps 713 to 718, the CPM server 702 delivers the CPM message to all devices 703, 704, 705 and 706 of the receiving clients. In steps 719 to 725, all the devices 703, 704, 705 and 706 each send a delivery report to the CPM server 702. In step 727, the CPM server 702 sends the delivery reports to Alice 701 in the form of a combined message.

Meanwhile, since all the devices 703, 704, 705 and 706 have read the CPM Message within the response limit time in steps 729 to 735, all the devices 703, 704, 705 and 706 each generate a read report and send it to the CPM server 702 in steps 737 to 743. In step 745, the CPM server 702 delivers the read reports to Alice 701 in the form of a combined message.

It is assumed in FIG. 8 that all of devices used by one receiving client have failed to read a received message. That is, device #1 703 of Ann has read a received message within the response limit time, but device #2 704 of Ann has not read a received message within the response limit time. Meanwhile, both of device #1 705 and device #2 706 of Bob have not read a received message within the response limit time.

Steps 811 to 827 are the same as steps 711 to 727 in FIG. 7. Steps 829 to 835 represent the assumption made above. In step 837, Ann's device #1 703 sends a read report to a CPM server 702. In step 839, Ann's device #2 704 does not send a read report because of the lapse of the response limit time. Likewise, in steps 841 and 843, Bob's device # 1 705 and device #2 706 do not send a read report because of the lapse of the response limit time. In step 845, the CPM server 702 sends Ann's read report to Alice 701 in the form of a combined message.

As in step 845, if the CPM server 702 receives a read report from one of multiple devices used by one user, the CPM server 702 may send the read report to the sending client Alice 701, determining that the user has read the message, according to the service policy.

Figure 9:
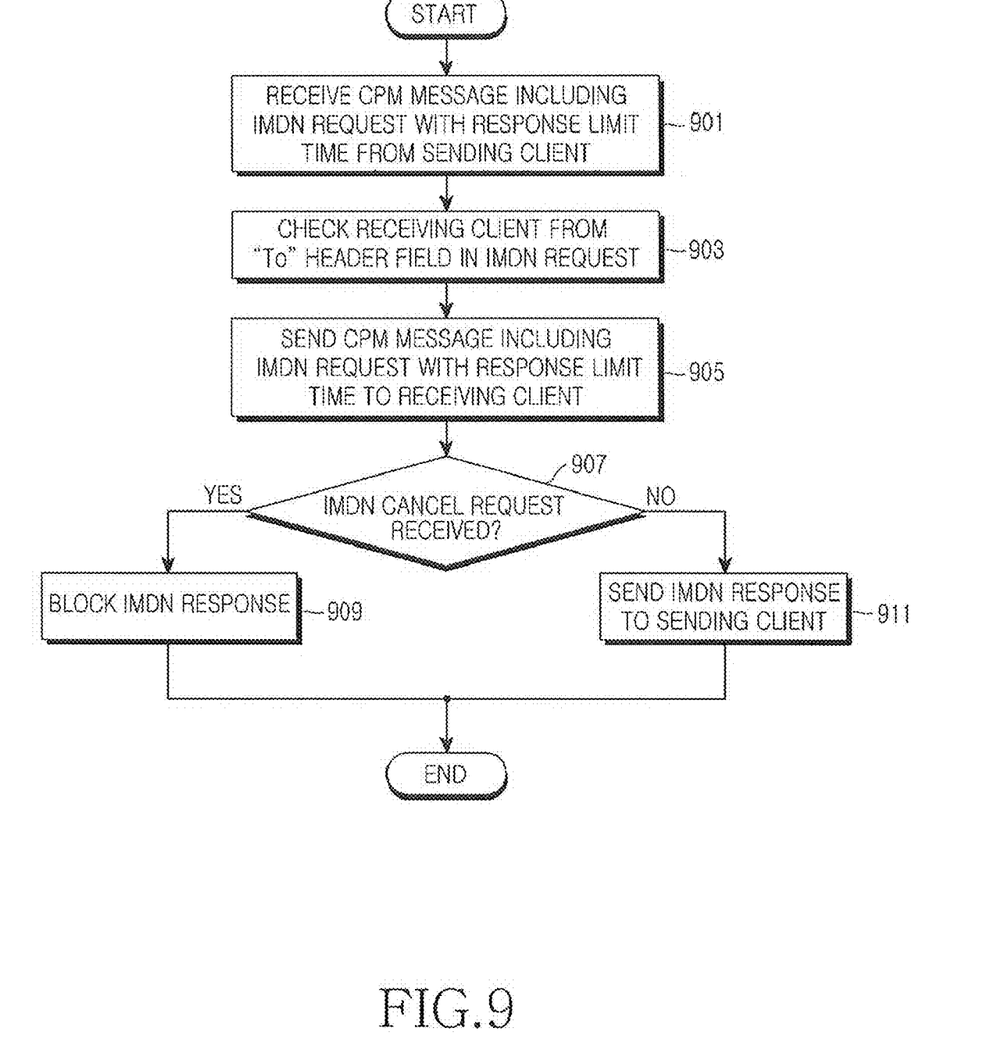
FIG. 9 is a flowchart illustrating an operation of a call server during an exchange of an IMDN request and a response thereto according to an embodiment of the present invention.

FIG. 9 is a flowchart illustrating an operation of a CPM server during an exchange of an IMDN request and a response thereto according to an embodiment of the present invention.

In step 901, a CPM server receives from a sending client a CPM message that has a response limit time being set therein, and includes an IMDN request for a delivery report and a read report. In step 903, the CPM server checks a particular header, i.e., a "To" header, in the IMDN request message to determine a receiving client to which the IMDN request is to be delivered. A URI value of the receiving client may be directly indicated in the "To" header according to the scheme of Table 4, or a reference value indicating a URI list group indicating a list of receiving clients may be written in the "To" header according to the scheme of Table 5.

In step 905, the CPM server generates a CPM message containing an IMDN request with the response limit time being set therein, and sends the CPM message to the determined receiving client. That is, if a URI value is indicated in the "To" header in accordance with the scheme of Table 4, the CPM server directly generates a CPM message with a response limit time being set therein for a receiving client corresponding to the URI value, and sends the CPM message. However, if a reference value for a URI list group is indicated in the "To" header in accordance with the scheme of Table 5, the CPM server generates a CPM message with a response limit time being set therein for receiving clients indicated by the reference value, and sends the CPM message.

Assuming that the CPM server has received an IMDN response to the sent CPM message from the receiving client(s), the CPM server determines in step 907 whether it has received an IMDN cancel request from the sending client before receiving the IMDN response. Upon receiving the IMDN cancel request, the CPM server blocks or discards the received IMDN response and no longer sends the IMDN response to the sending client in step 909. However, if the CPM server has not received the IMDN cancel request, i.e., if the CPM server has received the IMDN cancel request after receipt of an IMDN response, or has received no IMDN cancel request, the CPM server sends the received IMDN response to the sending client.

Figure 10:
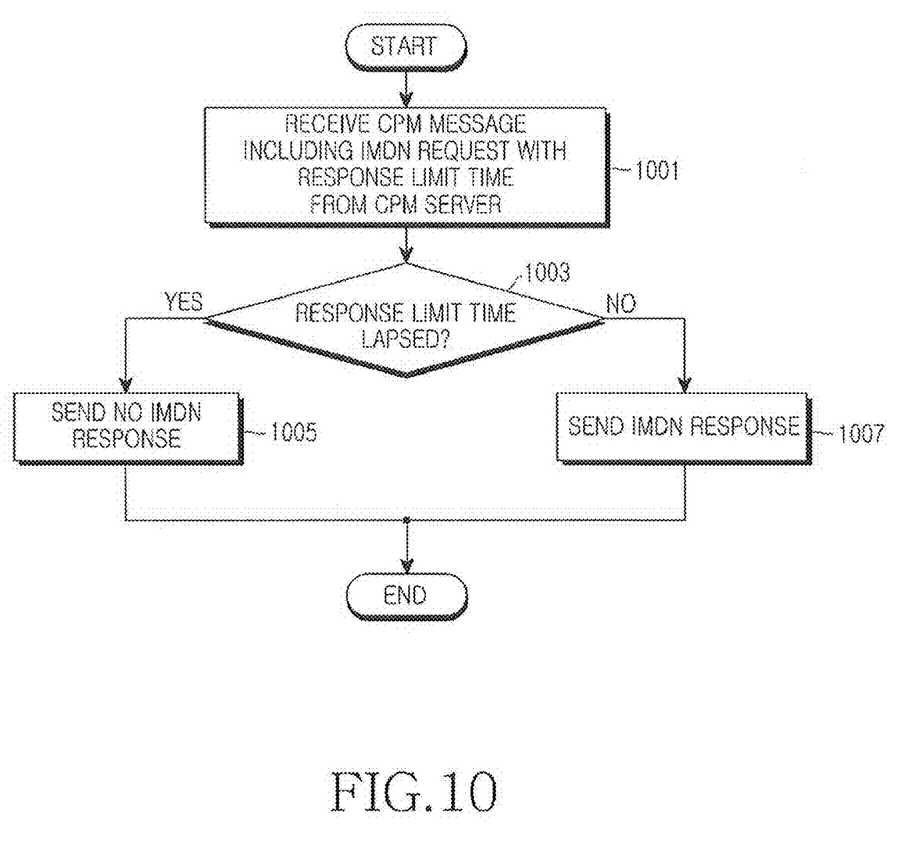
FIG. 10 is a flowchart illustrating an operation of a receiving client responding to an IMDN request according to an embodiment of the present invention.

FIG. 10 is a flowchart illustrating an operation of a receiving client responding to an IMDN request according to an embodiment of the present invention.

In step 1001, a receiving client receives a CPM message including an IMDN request with a response limit time being set therein, from a CPM server. In step 1003, the receiving client determines whether the response limit time has elapsed. If the response limit time has elapsed, i.e., if the received message has been read after a lapse of the response limit time, the receiving client sends no IMDN response in step 1005. However, if the response limit time has not elapsed, i.e., if the received message has been read within the response limit time, the receiving client sends an IMDN response to the CPM server.

Figure 11:
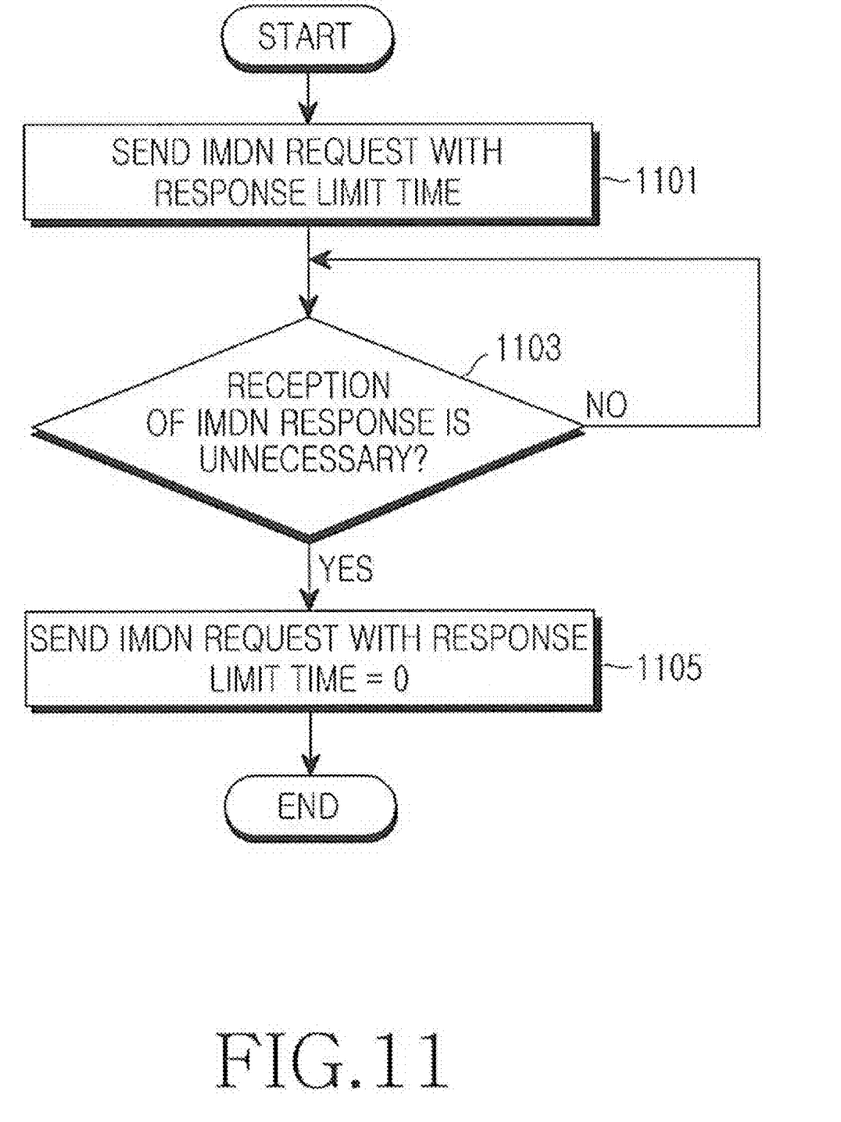
FIG. 11 is a flowchart illustrating an operation of a sending client sending an IMDN request according to an embodiment of the present invention.

FIG. 11 is a flowchart illustrating an operation of a sending client sending an IMDN request according to an embodiment of the present invention.

In step 1101, a sending client sends an IMDN request with a response limit time being set therein, to a CPM server. Hit is determined in step 1103 that there is no need to receive an IMDN response before a lapse of the set response limit time, the sending client sends a cancel request for an IMDN response in step 1105. That is, the sending client re-sends an IMDN request with a response limit time being reset to "0", to the CPM server.

Figure 12:
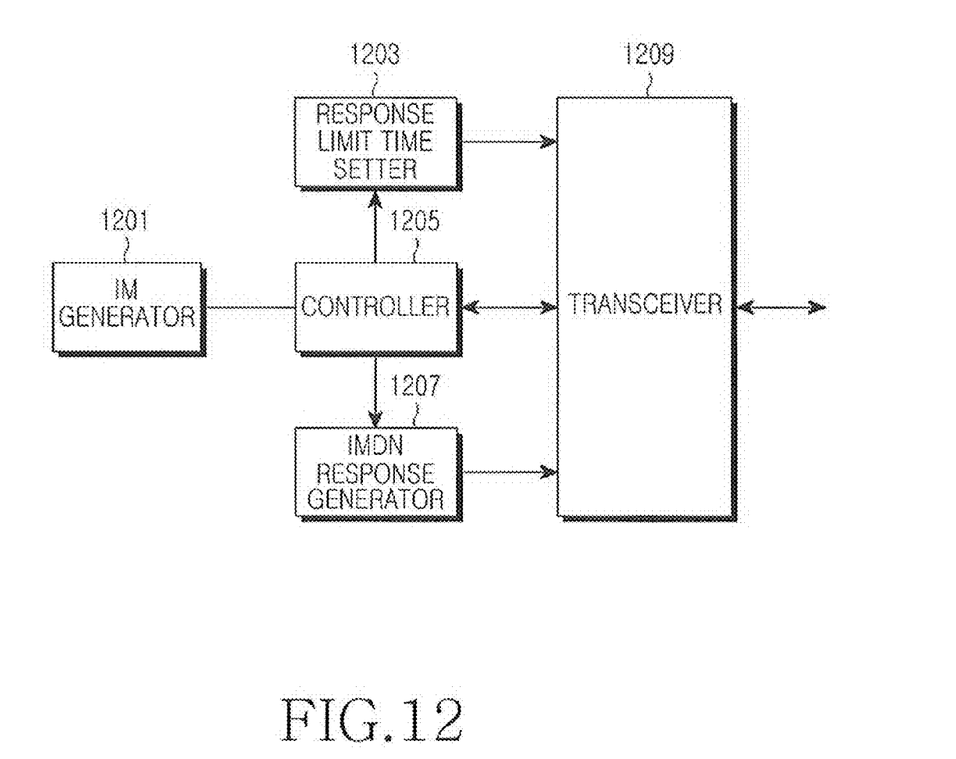
FIG. 12 is a block diagram illustrating a structure of a terminal apparatus sending an IMDN request and an IMDN response according to an embodiment of the present invention.

FIG. 12 is a block diagram of a structure of a terminal apparatus sending an IMDN request and an IMDN response according to an embodiment of the present invention.

A terminal apparatus according to the present invention includes an IM generator 1201, a response limit time setter 1203, a controller 1205, an IMDN response generator 1207, and a transceiver 1209. The terminal apparatus can be a sending terminal for sending an IMDN request, or a receiving terminal for sending an IMDN response to the IMDN request.

An operation of the terminal apparatus serving as a sending terminal will be described first.

The IM generator 1201 generates an IMDN request message including an IM message. The controller 1205 determines whether to set a response limit time for the IMDN message, and if there is a need to set the response limit time, the controller 1205 instructs the response limit time setter 1203 to set a predetermined response limit time. The response limit time setter 1203 sets a response limit time in the IMDN request according to the instruction from the controller 1205, and sends the IMDN request to a CPM server through the transceiver 1209. After sending the IMDN request with the response limit time being set therein, the controller 1205 determines whether there is no need to receive an IMDN response before a lapse of the response limit time. If there is no need, the controller 1205 provides a relevant instruction to the response limit time setter 1203. The response limit time setter 1203 resets the response limit time to "0" according to the instruction from the controller 1205, and sends an IMDN request with the response limit time=0 to the CPM server through the transceiver 1209.

Next, an operation of the terminal apparatus serving as a receiving terminal will be described.

Upon receiving an IMDN request with a response limit time being set therein through the transceiver 1209, the controller 1205 determines whether the response limit time has elapsed. If the response limit time has not elapsed, the controller 1205 instructs the IMDN response generator 1207 to generate an IMDN response. If the response limit time has elapsed, the controller 1205 instructs the IMDN response generator 1207 not to generate an IMDN response. Upon receiving an additional IMDN request with a response limit time being set to "0" through the transceiver 1209, the controller 1205 controls the IMDN response generator 1207 not to generate an IMDN response even before a lapse of the received response limit time. The IMDN response generator 1207, under the control of the controller 1201, generates an IMDN response and sends it through the transceiver 1209, or does not generate an IMDN response.

As is apparent from the foregoing description, according to the method and system proposed by the present invention, a sending client sets a response limit time in an IMDN request and sends the IMDN request, and a receiving client does not send an IMDN response after a lapse of the response limit time, avoiding sending an unnecessary IMDN response to the sending client. Thus, the receiving client has no need to consume unnecessary power, a CPM server can efficiently use resources, and the sending client may not receive unnecessary messages by determining whether to receive a message at its discretion, thereby ensuring efficient resource management and increasing quality satisfaction of users.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for sending an Instant Message Disposition Notification (IMDN) request to a receiving terminal by a sending terminal in a Converged-IP Messaging (CPM) service, comprising the steps of:
    generating an instant message to be sent to the receiving terminal;
    inserting an IMDN request message into the generated instant message, the IMDN request message including a predetermined response limit time; and
    sending the instant message with the IMDN request message to the receiving terminal through a CPM server.

2. The method of claim 1, wherein the IMDN request message is included in a message indicating whether the instant message has been delivered to the receiving terminal.

3. The method of claim 1, wherein the IMDN request message is included in a message indicating whether the receiving terminal has read the instant message.

4. The method of claim 1, further comprising:
    rescuing the response limit time to 0, if no IMDN response is to be received before a lapse of the response limit time; and
    including an IMDN request message with the response limit time being reset to 0 in an instant message, and sending the instant message to the receiving terminal.

5. The method of claim 4, wherein the IMDN request message is included in a message indicating whether the instant message has been delivered to the receiving terminal.

6. The method of claim 4, wherein the IMDN request message is included in a message indicating whether the receiving terminal has read the instant message.

7. A method for sending an instant Message Disposition Notification (IMDN) response by a receiving terminal in a Converged-IP Messaging (CPM) service, comprising the steps of:
    receiving, through a CPM server, an IMDN request message with a predetermined response limit time being set therein, which was sent by a sending terminal;
    determining whether the response limit time has elapsed; and
    sending no IMDN response if the response limit time has elapsed.

8. The method of claim 7, wherein the IMDN request message is included in a message indicating whether the instant message has been delivered to the receiving terminal.

9. The method of claim 8, wherein the IMDN request message is included in a message indicating whether the receiving terminal has read the instant message.

10. The method of claim 7, further comprising sending no IMDN response if an instant message including an IMDN request message with a response limit time being set to 0 is received before a lapse of the set response limit time.

11. The method of claim 7, wherein the IMDN request message is included in a message indicating whether the instant message has been delivered to the receiving terminal.

12. The method of claim 11, wherein the IMDN request message is included in a message indicating whether the receiving terminal has read the instant message.

13. A terminal apparatus for sending Instant Message Disposition Notification (IMDN) request and response in a Converged-IP Messaging (CPM) service, comprising:
    an instant message generator for generating an instant message including an IMDN request message;
    a response limit time setter for setting a response limit time for the response message;

a controller for including the set response limit time and the IMDN request message in the instant message, and sending the instant message through a transceiver; and the transceiver for sending the instant message through a CPM server.

14. The terminal apparatus of claim 13, wherein the IMDN request message is included in a message indicating whether the instant message has been delivered to a receiving terminal.

15. The terminal apparatus of claim 13, wherein the IMDN request message is included in a message indicating whether a receiving terminal has read the instant message.

16. The terminal apparatus of claim 13, wherein the controller instructs the response limit time setter to receive no IMDN response before a lapse of the set response limit time, and wherein the response limit time setter resets the response limit time to 0 according to the instruction of the controller and generates an IMDN request message with the response limit time being reset to 0.

17. The terminal apparatus of claim 15, wherein the IMDN request message is included in a message indicating whether the instant message has been delivered to the receiving terminal.

18. The terminal apparatus of claim 15, wherein the IMDN request message is included in a message indicating whether the receiving terminal has read the instant message.

19. The terminal apparatus of claim 13, wherein the transceiver receives through the CPM server an IMDN request message with a predetermined response limit time being set therein, and wherein the controller determines whether the response limit time has elapsed, and controls an IMDN response generator to generate no IMDN response if the response limit time has elapsed.

20. The terminal apparatus of claim 19, wherein the IMDN request message is included in a message indicating whether the instant message has been delivered to a receiving terminal.

21. The terminal apparatus of claim 19, wherein the IMDN request message is included in a message indicating whether a receiving terminal has read the instant message.

22. The terminal apparatus of claim 19, wherein the controller controls the IMDN response generator to generate no IMDN response if an instant message including an IMDN request message with a response limit time being set to 0 is received through the transceiver before a lapse of the set response limit time.

23. The terminal apparatus of claim 22, wherein the IMDN request message is included in a message indicating the instant message has been delivered to a receiving terminal.

24. The terminal apparatus of claim 22, wherein the IMDN request message is included in a message indicating whether a receiving terminal has read the instant message.

* * * * *